Oct. 27, 1942.   W. A. WISSLER   2,299,778
MAKING METAL COMPOSITE ARTICLES
Filed June 7, 1939
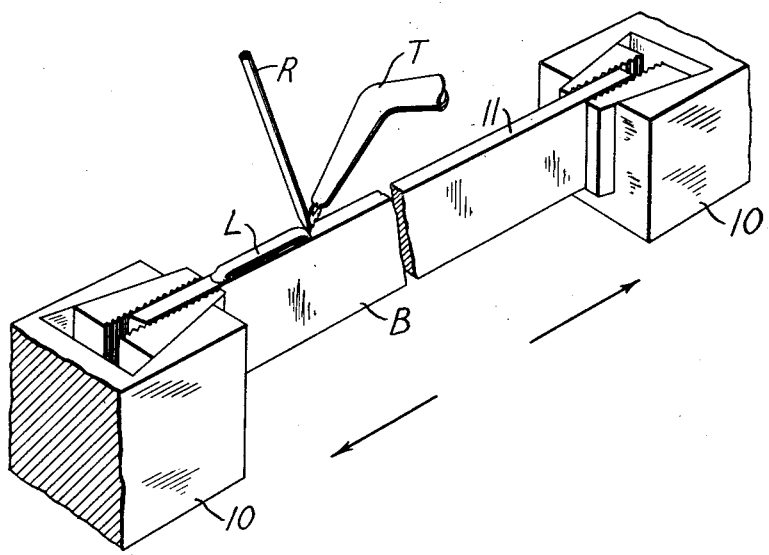
INVENTOR
WILLIAM A. WISSLER
BY
ED Greenewald
ATTORNEY Patented Oct. 27, 1942

2,299,778

UNITED STATES PATENT OFFICE 2,299,778

MAKING METAL COMPOSITE ARTICLES

William A. Wissler, Niagara Falls, N. Y., assignor to Haynes Stellite Company, a corporation of Indiana Application June 7, 1939, Serial No. 277,877

4 Claims. (Cl. 113—112)

This invention relates to the production of composite metal articles and particularly to a method of controlling the distortion normally occurring when two or more dissimilar metals are united at elevated temperatures to form such articles and subsequently cooled to normal temperatures.

The invention will be particularly described with reference to the production of composite articles having a body or backing of steel and a surface layer composed of an alloy containing chromium, tungsten, and cobalt, for example an alloy of the "Stellite" type, thermally deposited on said steel body by means of a high temperature oxy-acetylene flame.

In the usual method of producing such articles the steel backing is preheated at its surface to a temperature somewhat below its melting point and the protective alloy is melted and deposited thereon, from a welding rod for instance. The composite article so formed is then slowly cooled. Frequently, while cooling, stresses are set up in both the steel backing and in the surface layer which, due to differences in composition, strength, coefficient of expansion, and temperatures to which the two metals have been heated, are sufficient to cause the composite article to be distorted or warped when finally cooled. Generally, the stresses induced in the surface layer of metal are tensile in nature, and inasmuch as materials of this type are hard and relatively weak under tension the surface layer of the article may be cracked by slight shock.

It has heretofore been proposed to overcome such distortion by rigidly clamping the backing in a fixed position during the welding operation, or by bending the backing in a direction counter to that expected to be produced after welding and cooling the article. Such expedients are very difficult to control and may not overcome the undesirable effect of having the entire surface layer in a state of tension when subsequently cooled.

In accordance with the present invention, the distortion normally occurring when two or more metals are united at elevated temperatures and cooled to normal temperatures is eliminated or substantially reduced by a method which comprises subjecting the backing to tensile stresses which are preferably maintained throughout deposition and cooling of the surface layer of metal. Under such conditions both the backing and the solidified portions of the surface layer are in tension during the welding step. Upon release of the load there is a more nearly equal contraction of both the surface layer and the backing, thus eliminating or substantially reducing distortion or warpage of the article. The proper degree of tension to be applied to the backing in order to overcome such distortion may be determined empirically and is dependent principally on the composition and strength of the materials employed and the temperature to which the backing is heated during the welding operation.

The accompanying drawing illustrates the method of the invention. The sole figure is a diagrammatic view of a steel backing B, and a surface layer L of metal deposited thereon in accordance with the method of the invention.

The following specific examples, which will be described with reference to the sole figure of the accompanying drawing, illustrate the application of the invention to the production of composite articles, such as turbine blades, cutter blades, shear blades and the like, having a hard, wear-resistant surface layer composed of an alloy containing chromium, tungsten, and cobalt. Tests were made using backing materials consisting respectively of a plain carbon steel containing about 0.20% carbon, and a chromium steel containing about 13% chromium and 0.10% carbon. In both instances, the backing B about ⅛ inch thick by 1 inch wide by 8 inches long, was held at its ends in grips 10 of a portable tensile testing apparatus (not shown) adapted to apply a tensile load to the backing B while said backing was held in a horizontal position with a long edge or surface 11 uppermost. A constant tensile load was then applied to the backing B in the direction of the large arrows, and a surface layer L of "Stellite" was thermally deposited on the surface 11 of said backing by means of an oxy-acetylene welding torch T and a welding rod R. Tension was maintained on the backing B until the deposition of the surface layer L was completed and thereafter until the composite article so formed had cooled to a temperature of about 400° C. The composite article was then permitted to cool slowly to normal temperature.

To illustrate the advantage of maintaining the backing B in tension while applying the surface layer L, the distortion in composite articles so prepared was compared with the distortion in similar articles to which no tension had been applied to the backing during a similar welding operation. Deviation from a straight line was measured in inches per inch over the 8 inch dimension along the unsurfaced edge. The results are indicated in the following table.

| Backing material | Tensile load applied (lb. per sq. in.) | Maximum deviation from straight line (in. per in.) |
|---|---|---|
| Plain steel (about 0.20% C) | None | 0.009 |
| Do | 8,000 | 0.001 |
| Chromium steel (about 13% Cr and 0.10% C) | None | 0.003 |
| Do | 12,000 | 0.000 |

It can be seen from the foregoing data that the invention is effective in preventing or substantially eliminating the distortion normally occurring in composite articles which have had a surface layer of metal applied in the usual manner.

In the foregoing examples the distortion has been measured in a plane normal to the surface 11. However, the invention is equally effective in reducing distortion of the backing B in other directions.

The specific examples given herein are merely illustrative of the method of this invention and many modifications are possible within its scope and spirit. For instance, in each of the examples given above the layer of surface metal was deposited in a liquid or semi-liquid state by melting a suitable rod of the metal. However, the method is applicable to the production of composite articles formed by joining two or more slabs of the desired metals by suitable bonding and heating means. In such instances, the metal or combination of metals which would tend to contract the least upon cooling are placed in tension at least for a portion of time during the joining and subsequent cooling steps.

The method of the invention is not limited to the use of alloys of the "Stellite" type. Many other metals and alloys may be employed as a surface layer with as good results. The method of the invention may also be used in the production of composite articles from metals of approximately the same composition, inasmuch as distortion resulting from unequal stresses is normally present in such articles if their component metals are of unequal size or have been heated to widely different temperatures before being permitted to cool.

I claim:

1. In a process of weld uniting a hot body of metal to an edge of a cooler blade and cooling the resulting composite body, the method of decreasing the distortion of the composite body which would normally occur when the said hot body is cooled, which method comprises, without bending, subjecting said cooler blade during the operation to a tensile stress such that upon its release the cooler blade shortens to substantially the same extent as the hot body is contracted by cooling to ordinary temperatures and releasing such tensile stress after the uniting operation is complete.

2. Method which comprises depositing by fusion deposition welding a layer of a relatively hard and brittle metal upon a relatively ductile metal body, cooling the resulting composite body whereby the said layer contracts, and during such deposition welding maintaining the said ductile body under a tensile stress such that upon its release the body shortens to substantially the same extent that the said layer contracts on cooling and releasing such tensile stress after said layer has solidified.

3. Method which comprises depositing by fusion deposition welding on an edge of a strip of metal a relatively thin layer of metal, cooling the resultant composite article whereby the said layer contracts, and during such deposition welding maintaining the said strip under a tensile stress such that upon its release the strip shortens to substantially the same extent that the said layer contracts on cooling, and releasing such tensile stress after said layer has solidified.

4. Method which comprises fusion depositing by oxyacetylene welding on an edge of a strip of metal a thin layer of a cobalt-chromium-tungsten alloy, cooling the resultant composite article whereby the said layer contracts, and during such deposition welding maintaining the said strip under a tensile stress such that upon its release the strip shortens to substantially the same extent that the said layer contracts on cooling, and releasing such tensile stress after said layer has solidified.

WILLIAM A. WISSLER.